United States Patent
Chen et al.

(10) Patent No.: US 9,135,019 B2
(45) Date of Patent: Sep. 15, 2015

(54) COMPUTER AND HARDWARE PARAMETER CONFIGURING METHOD THEREOF

(71) Applicant: MSI ELECTRONIC (KUN SHAN) CO., LTD, Kunshan (CN)

(72) Inventors: Chung-Wei Chen, New Taipei (TW); Hsuen-Yung Chen, Taipei (TW)

(73) Assignee: MSI COMPUTER(SHENZHEN)CO., LTD., Shenzhen, Guangdong Province (CN)

(*) Notice: Subject to any disclaimer, the term of this patent is extended or adjusted under 35 U.S.C. 154(b) by 388 days.

(21) Appl. No.: 13/731,997

(22) Filed: Dec. 31, 2012

(65) Prior Publication Data

US 2014/0095854 A1  Apr. 3, 2014

(30) Foreign Application Priority Data

Sep. 28, 2012  (TW) .............................. 101135934 A

(51) Int. Cl.
| | |
|---|---|
| *G06F 9/24* | (2006.01) |
| *G06F 15/177* | (2006.01) |
| *G06F 9/44* | (2006.01) |
| *G06F 3/06* | (2006.01) |
| *G06F 21/57* | (2013.01) |
| *G06F 11/14* | (2006.01) |
| *G06F 9/445* | (2006.01) |

(52) U.S. Cl.
CPC ............ *G06F 9/4401* (2013.01); *G06F 9/4403* (2013.01); *G06F 3/0625* (2013.01); *G06F 9/44505* (2013.01); *G06F 11/1417* (2013.01); *G06F 11/1438* (2013.01); *G06F 11/1441* (2013.01); *G06F 21/575* (2013.01)

(58) Field of Classification Search
CPC ... G06F 1/3203; G06F 1/3221; G06F 3/0625; G06F 3/0634; G06F 8/65; G06F 11/1417; G06F 15/177; G06F 21/575
USPC .................................................. 713/1, 2, 100
See application file for complete search history.

(56) References Cited

U.S. PATENT DOCUMENTS

| 7,370,221 B2 * | 5/2008 | Tang et al. ..................... 713/501 |
| 2003/0065915 A1 * | 4/2003 | Yu et al. ............................ 713/1 |

FOREIGN PATENT DOCUMENTS

| CN | 101561703 A | 10/2009 |
| TW | 201001289 | 1/2010 |

*Primary Examiner* — Michael J Brown
(74) *Attorney, Agent, or Firm* — Muncy, Geissler, Olds & Lowe, P.C.

(57) ABSTRACT

A hardware parameter configuring method operating under in an Extensible Firmware Interface-based basic input/output system mode includes reading a currently-existing hardware profile including multiple hardware parameters; reading a preloading hardware profile including multiple hardware parameters; comparing the currently-existing hardware parameters with their corresponding preloading hardware parameters to generate a comparison result; displaying the comparison result through a graphical interface; and loading the preloading hardware parameters to the hardware units to replace the currently-existing hardware parameters when receiving confirmation signal. Moreover, a computer having a central processing unit (CPU) used for implementing the steps including reading a current-existing hardware profile; reading a preloading hardware profile, comparing the currently-existing hardware parameters with their corresponding preloading hardware parameters to generate a comparison result; displaying the comparison result through a graphical interface; and loading the preloading hardware parameters to the hardware units to replace the currently-existing hardware parameters when receiving confirmation signal.

16 Claims, 6 Drawing Sheets

COMPUTER AND HARDWARE PARAMETER CONFIGURING METHOD THEREOF

CROSS-REFERENCE TO RELATED APPLICATIONS

This non-provisional application claims priority under 35 U.S.C. §119(a) on Patent Application No(s). 101135934 filed in Taiwan, R.O.C. on Sep. 28, 2012, the entire contents of which are hereby incorporated by reference.

BACKGROUND

1. Technical Field

The disclosure relates to a computer and a hardware parameter configuring method thereof, and more particularly to a computer and a hardware parameter configuring method thereof when the computer operates in a unified extensible firmware interface basic input/output system (UEFI BIOS) mode.

2. Related Art

Electronic devices such as a variety of computers are generally equipped with dedicated processors or processing units in order to not only operate properly but process the data efficiently. When the computer is powered on, a basic input/output system (BIOS) is loaded to ensure the basic hardware structure of the computer is in place for initialization, before an operating system of the computer could take over. Traditional BIOS is generally a 16-bit-based system, which appears outdated when incorporated, along with more advanced processors/processing units that are 32-bit or even 64-bit-based. Therefore, placing the traditional BIOS and these processors/processing units in the same computers may limit the potential performance of these processors/processing units. To solve the problem of the disparity between the BIOS and the processors/processing units, the UEFI BIOS has been developed. When the computer operates in the UEFI BIOS mode, configurations of hardware parameters such as a central processing unit (CPU) frequency and a CPU multiplier can be modified and stored in the form of a hardware profile, which may be shared among computer users. Consequently, computer users may have access to download other hardware parameters from other users, offering them the opportunities of using the similar hardware parameters to fully utilize the hardware structure of their computers. Moreover, by downloading other hardware profile, the computer users can evaluate the skill of over-clocking.

However, since the computers may vary from each other in terms of computer hardware structure, simply loading the hardware profile from others may not necessarily optimize each and every computer. Furthermore, loading the other hardware profile without any protection mechanism may risk the computers being damaged because the loaded hardware parameters from the other hardware profile may be not suitable for the computer due to different hardware structure.

SUMMARY

For configuring multiple hardware units of a computer in an Extensible Firmware Interface-based basic input/output system mode, the disclosure provides a hardware parameter configuring method. The steps of the hardware parameter configuring method start with reading a currently-existing hardware profile including multiple currently-existing hardware parameters and reading a preloading hardware profile, wherein the preloading hardware profile includes multiple preloading hardware parameters and each of the preloading hardware parameters corresponds to each of the currently-existing hardware parameters. The steps of the hardware configuring method then compares the currently-existing hardware parameters with their corresponding preloading hardware parameters to generate a comparison result and display the currently-existing hardware parameters, the preloading hardware parameters and the comparison result through a graphical interface. Thus, a user can determine whether to load the preloading hardware parameters based on the comparison result and the hardware parameter configuring method can cause the computer to load the preloading hardware parameters to the hardware units to replace the currently-existing hardware parameters when the computer receives a confirmation signal from the user.

Moreover, the disclosure discloses a computer having multiple hardware units operating with multiple currently-existing hardware parameters, with one of the hardware units being a central processing unit (CPU). The CPU is configured to implement the steps starting with reading a current-existing hardware profile including multiple hardware parameters and reading a preloading hardware profile, wherein the preloading hardware profile includes multiple preloading hardware parameters and each of the preloading hardware parameters corresponds to each of the currently-existing hardware parameters respectively. The CPU then is configured to implement the steps of comparing the currently-existing hardware parameters with their corresponding preloading hardware parameters and generate a comparison result. Subsequently, implemented by the CPU, the currently-existing hardware parameters, the preloading hardware parameters and the comparison result are displayed through a graphical interface. Lastly, the CPU is configured to implement the step of loading the preloading hardware parameters to the hardware units to replace the currently-existing hardware parameters when the confirmation signal is received.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

The disclosure provides a computer and its hardware parameter configuring method for configuring multiple hardware units in a computer operating in an Extensible Firmware Interface Basic Input/output System (Unified Extensible Firmware Interface Basic Input/output System, UEFI BIOS) mode.

Figure 1:
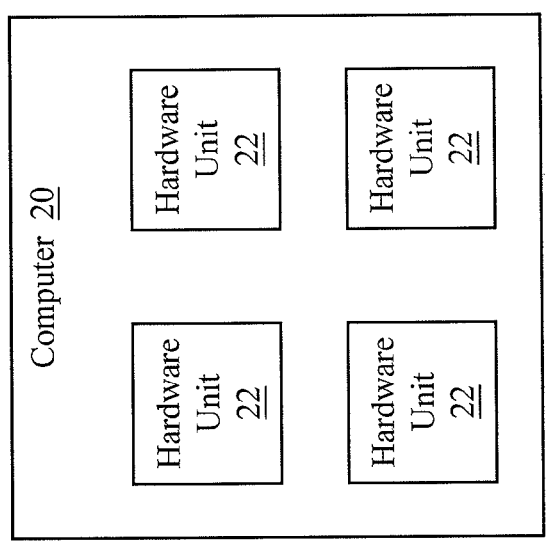
FIG. 1 is a simplified block diagram of a computer according to one embodiment of the disclosure.

Please refer to FIG. 1, which is a simplified block diagram of a computer 20 according to one embodiment of the disclosure. The computer 20 includes multiple hardware units 22. In one embodiment, the hardware unit 22 is a hardware installed on a motherboard of the computer 20, such as a central processing unit (CPU), a memory, a graphics card or a storage device. In other embodiments, the hardware units 22 may refer to peripherals of the computer 20. The CPU of the computer 20 is configured to perform the hardware parameter configuring method in the UEFI BIOS mode so as to load corresponding hardware parameters to the hardware units 22. The aforementioned storage device may be a hard disk, a cache memory, a disk array (i.e. redundant array of inexpensive disk, RAID) or a pluggable memory card.

Figure 2:
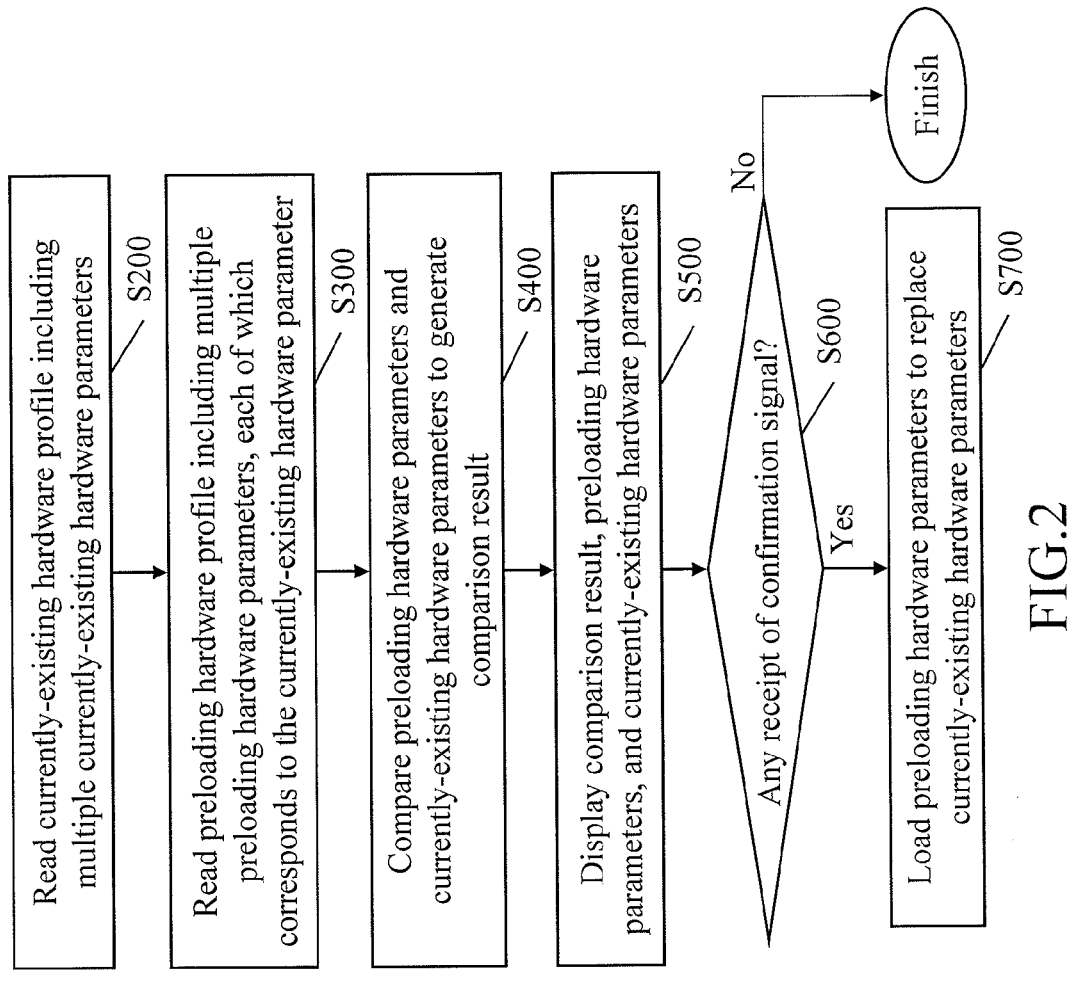
FIG. 2 is a flow chart of a hardware parameter configuring method according to one embodiment of the disclosure.

Please refer to FIG. 2, which is a flow chart of a hardware parameter configuring method according to one embodiment of the disclosure.

The method includes causing a CPU to read a currently-existing hardware profile including multiple currently-existing hardware parameters therein (step S200). Then, the method also includes causing the CPU to read a preloading hardware profile including multiple preloading hardware parameters (step S300). It is worth noting that each of the preloading hardware parameters may correspond to each of the currently-existing hardware parameters. The storage device in the computer may be configured to store one or more preloading hardware profiles. At least one of the hardware profiles may be presented and selected through a graphical user interface before the hardware parameters in the selected hardware profile may be actually loaded into the hardware units 22 of the computer. In step S300, the CPU may select a hardware profile designated by the users to be the preloading hardware profile before accessing the storage device to read that particular hardware profile.

The currently-existing hardware parameters and the preloading hardware parameters may correspond to the hardware units 22 of the computer. For example, these hardware parameters may be a CPU model, a CPU frequency, a CPU multiplier, a CPU operating voltage, a memory operating frequency, a memory operating voltage, and/or a video card multiplier.

Except the preloading hardware parameters, the preloading hardware profile may also include a motherboard brand and model, a basic input-output system version, a file storage time, a memory capacity, an ambient temperature, a CPU temperature, and a fan speed. The CPU model and the motherboard brand and model may be represented in a series of numbers and characters.

After reading the preloading hardware parameters, the CPU may compare the preloading hardware parameters with their corresponding currently-existing hardware parameters, in order to generate a comparison result (step S400). In one embodiment, the CPU may individually compare each of the preloading hardware parameters with each of the corresponding currently-existing hardware parameters and determine whether the preloading hardware parameters are greater than the currently-existing hardware parameters for the generation of the comparison result. The comparison result, the currently-existing hardware parameters and the preloading hardware parameters may be presented in the graphical interface by the CPU operating in the UEFI BIOS mode (step S500). In one embodiment, the comparison result between the currently-existing hardware parameters and the preloading hardware parameters may be represented numerically or even graphically such as bar charts.

Figure 3:
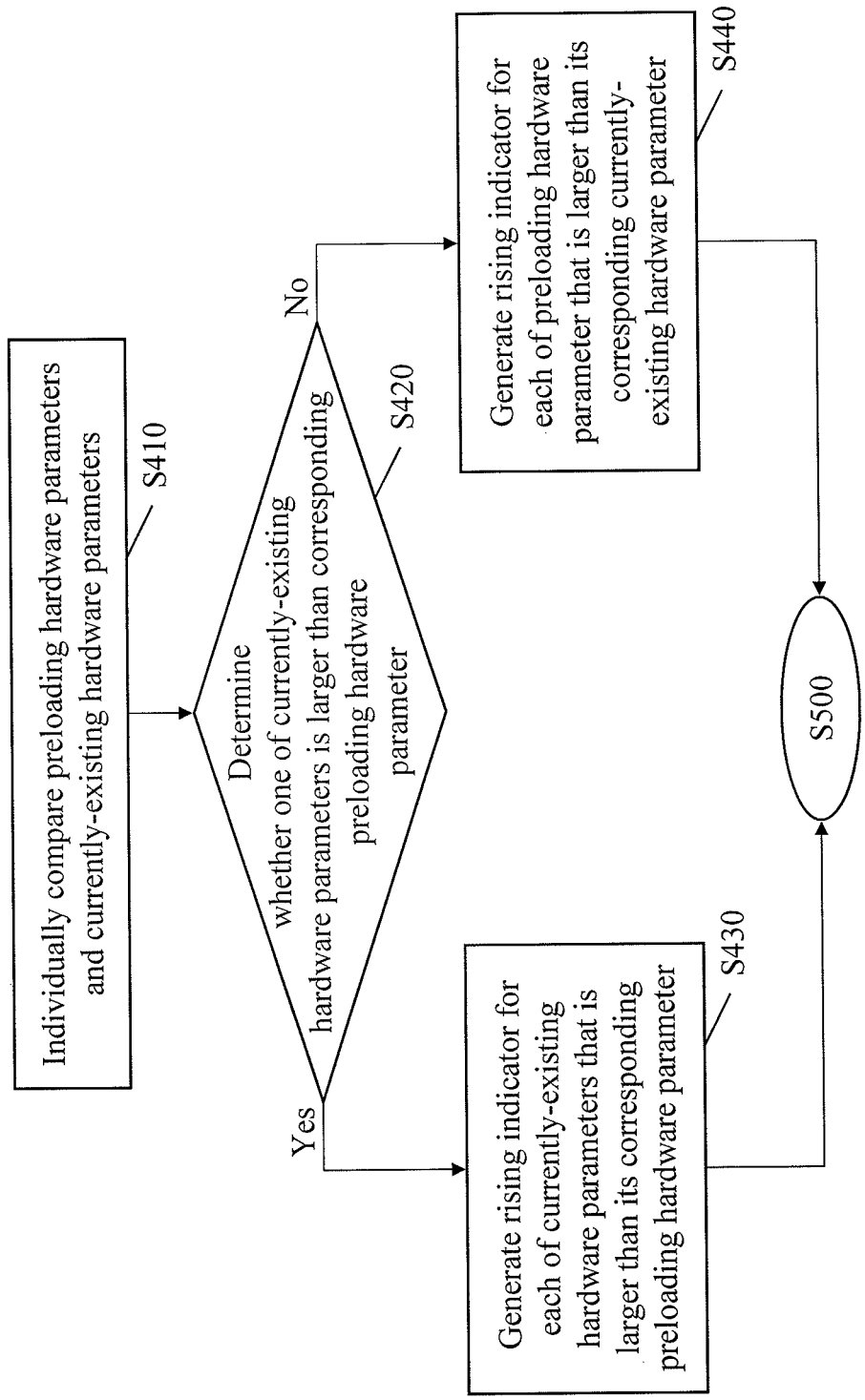
FIG. 3 is a flow chart of one step in the flow of FIG. 2 according to one embodiment of the disclosure.

FIG. 3 is a flowchart of the step S400 according to one embodiment of the disclosure. In FIG. 3, the comparison result may include at least one rising indicator.

In step S400, as previously mentioned, the CPU is configured to individually compare the currently-existing hardware parameters with their corresponding preloading hardware parameters into the computer (step S410), and determine whether at least one of the currently-existing hardware parameters is greater than the corresponding preloading hardware parameter (step S420). For example, the CPU may compare the CPU multiplier in the currently-existing hardware parameters with the CPU multiplier in the preloading hardware parameters. The CPU multiplier in the currently-existing hardware parameters and the CPU multiplier in the preloading hardware parameters hereafter are referred to as a currently-existing CPU multiplier and preloading CPU multiplier, respectively. Other hardware parameters are similar to the above-mentioned hardware parameters, so the similarities are not repeated herein.

When at least one of the currently existing hardware parameters is greater than the corresponding preloading hardware parameters, the CPU may generate the rising indicator for the currently-existing hardware parameter that is greater than the corresponding preloading hardware parameter (step S430). Conversely, when at least one of the currently-existing hardware parameters is less than the corresponding preloading hardware parameters, the CPU may also generate the rising indicator for the particular preloading hardware parameter that is greater than the corresponding currently-existing hardware parameter (step S440). When the currently-existing hardware parameters and the preloading hardware parameters are the same, the rising indicator may not be generated.

Assuming the currently-existing video card multiplier is 27, and the preloading video card multiplier is 26, the CPU in step S420 may determine the currently-existing video card multiplier is greater than the preloading video card multiplier. Therefore, in step S430, the rising indicator is generated for the currently-existing video card multiplier. When the currently-existing CPU multiplier is 34 while the preloading CPU multiplier is 37, the CPU in step S420 is to determine the preloading CPU multiplier is greater than its currently-existing counterpart. Thus the rising indicator is shown for the preloading CPU multiplier in step S440.

Figure 4:
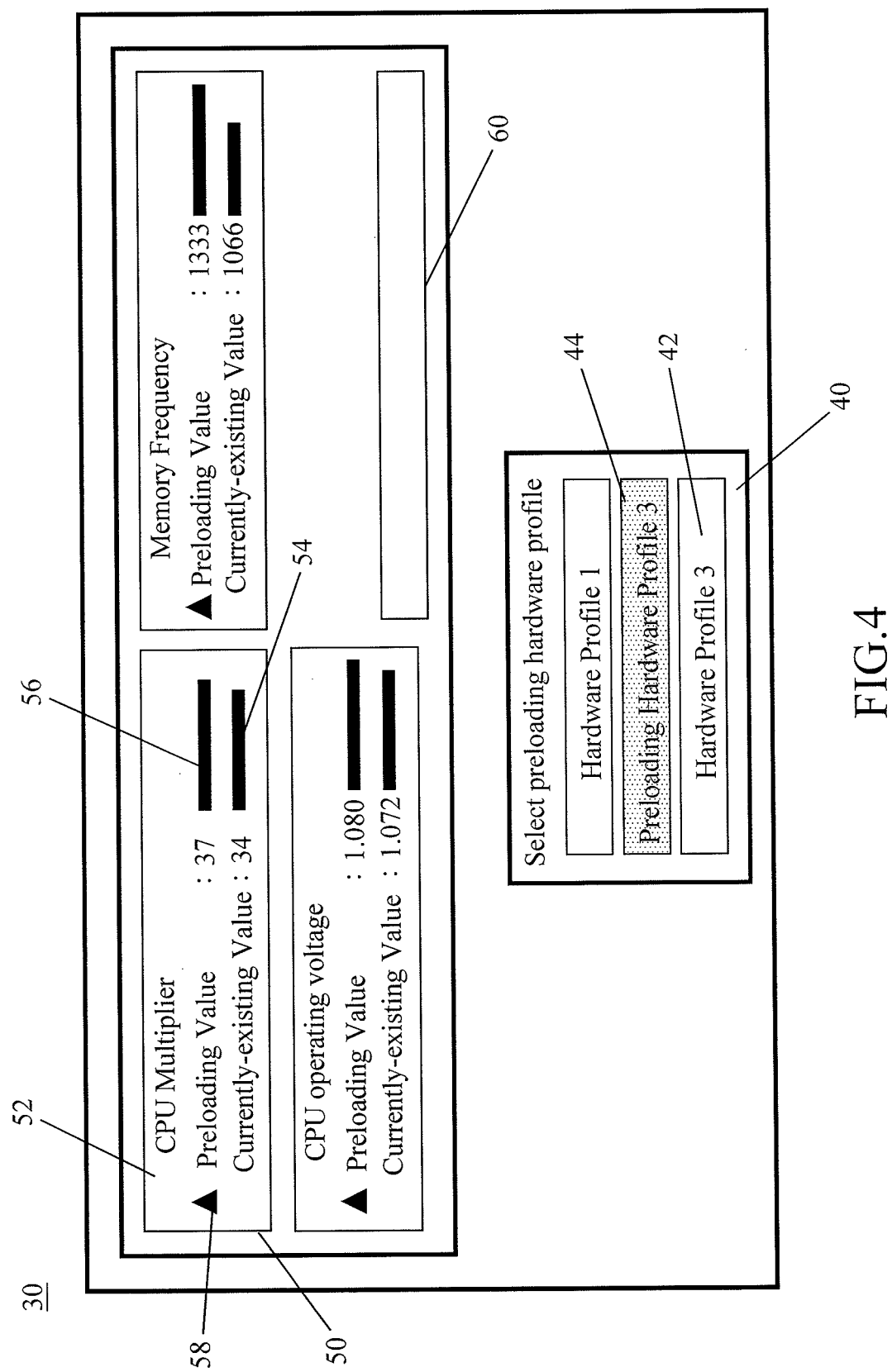
FIG. 4 is a schematic diagram of a graphical interface according to one embodiment of the disclosure.

Please refer to FIG. 4, which is a schematic diagram of a graphical interface 30 according to one embodiment of the disclosure.

The graphical interface 30 may display a menu 40 and multiple display grids 50 corresponding to the preloading hardware parameters. The graphical interface 30 may enable computer users to manipulate through keyboards or touch screens when the computer operates in the UEFI BIOS mode. The menu 40 may list more than one hardware profile 42 stored in the computer with one of the hardware profiles capable of being selected through the graphical interface 30 as the preloading hardware profile 44.

Each display grid 50 corresponds to one of the currently-existing hardware parameters and one of the preloading hardware parameters. More specifically, each display grid 50 may include an item name 52, a currently-existing parameter value, the currently-existing parameter value represented as an icon 54, an icon 56 representing the preloading hardware parameter value and the rising indicator 58. In addition, the graphical interface 30 may further include a warning message area 60 where various warning messages may be displayed.

The item name 52 may display "the CPU multiplier," with its currently-existing value being 34 and the corresponding icon 54 being a long bar representative of the value of 34.

Meanwhile, the preloading value of the CPU multiplier may be 37 and the corresponding icon 56 may represent the value of 37 as another long bar. It is worth noting that the icons 54 for the values of the currently-existing hardware parameters and the icons 56 for the values of the preloading hardware parameters may be in the form of pie charts, radar charts, or others commonly used to indicate the numerical values. And the rising indicator 58 may be, for example, an upwardly pointing triangle or arrow.

Figure 5:
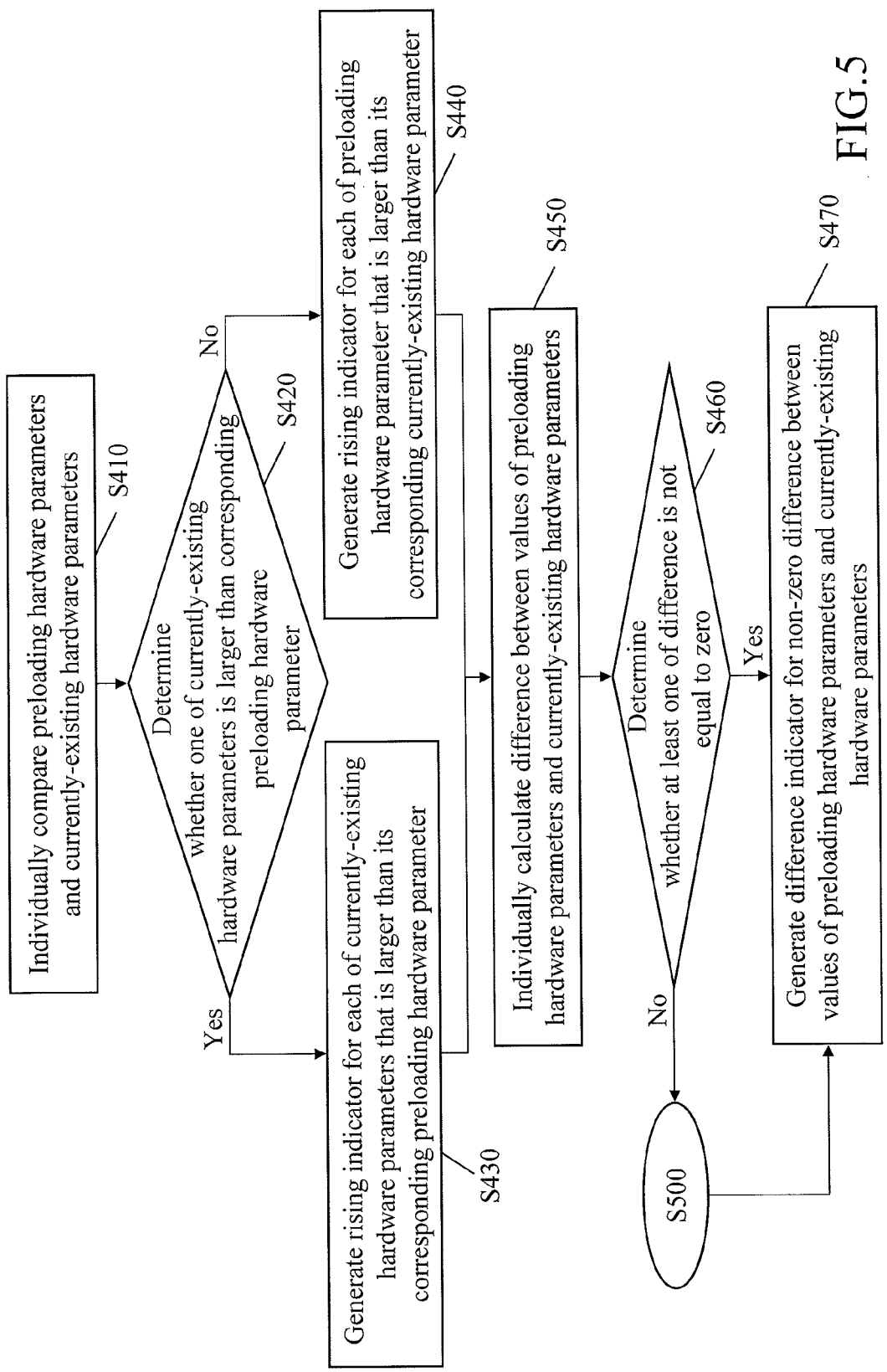
FIG. 5 is a flow chart of the steps illustrated in FIG. 3 according to one embodiment of the disclosure.

Please refer to FIG. 5, which is a flow chart of the Step S400 illustrated in FIG. 3 according to one embodiment of the disclosure. In this embodiment, the comparison result may include at least one difference indicator.

After the CPU executes step S410 to step S440, the CPU may determine the difference between the currently-existing hardware parameters and the preloading hardware parameters by subtracting the latter from the former (step S450). It is worth noting that step S450 may be merged with step S410 or step S420. Then, the CPU may determine whether the difference is not equal to zero (step S460). When the difference is not equal to zero (or there does exist a difference between the currently-existing hardware parameters and the preloading hardware parameters), the difference may be represented as the difference indicator (step S470). Using the above example where the currently-existing CPU multiplier and the preloading CPU multiplier is 3 (=37–34), and the difference may be represented as the difference indicator and presented next to the icon 56 for the preloading hardware parameters and/or the rising indicator 58.

The comparison result may lead to the preparation of a dropping indicator in the event that at least one of the currently-existing hardware parameters is greater than the preloading hardware parameters. The dropping indicator may be, for example, a downwardly pointing triangle or an arrow.

In another embodiment, the comparison result may lead to at least one optimization indicator. In step S400, CPU may further determine whether the preloading hardware parameters are better than the currently-existing hardware parameters according to the item of the hardware parameters and the above-mentioned difference. Take the CPU frequency for example, when the difference between the multiples of the CPU frequency in the preloading hardware parameters and the currently-existing hardware parameters is positive, it indicates the preloading hardware parameters when loaded into the computer may provide better computing performance. As such, the optimization indicator may be generated for the preloading CPU multiplier. Take the CPU operating voltage for example, when the CPU operating voltage in the currently-existing hardware parameters is lower than the CPU operating voltage in the preloading hardware parameters, no optimization indicator may be generated for that particular hardware parameter since the lower CPU operating voltage generally corresponds to less power consumption on the part of the computer.

Also noteworthy is that the rising indicator 58, the dropping indicator, the difference indicator and the optimization indicator may be represented in words, symbols or icons.

After the presentation of the comparison result along with the above-mentioned indicators, whether to have the hardware profile 44 having the preloading hardware parameters loaded to the hardware units may be further determined by the users. In addition, the users can choose another hardware profile 42 having another set of the preloading hardware parameters for the generation of another comparison result.

If the hardware profile having the preloading hardware parameters is determined to replace the currently-existing hardware parameters, the graphical interface may be equipped with a confirmation button which can be pressed through the keyboard, the mouse or the touch screen and this may cause a generation of confirmation signal. The CPU at the time of causing the display of comparison results may continue to determine whether the any such confirmation signal is issued and received (step S600). Upon the receipt of the confirmation signal, the CPU may load the selected hardware parameters into the hardware units 22 in order to replace the currently-existing hardware parameters (step S700). More specifically, the CPU may access the storage device to read the preloading hardware parameters into the computer before loading the same to the hardware unit 22. For example, the operating voltage of the CPU may be changed to the CPU operating voltage specified in the selected preloading hardware parameters into the computer when memory operating voltage may be changed as the result of the CPU loading the preloading hardware parameters to the hardware units 22.

Despite the loading of the preloading hardware parameters to the hardware units 22, those hardware parameters may not be necessarily suitable for the operation of the computer. For example, the loaded hardware parameters may exceed upper limits of the computer, so that the loading of the hardware parameters may cause damages on the part the computer 20. Before the loading of those selected hardware parameters, the method according to the disclosure may offer a protection mechanism for ensuring the occurrences of causing the damages on the part of the computer may be minimized.

Figure 6:
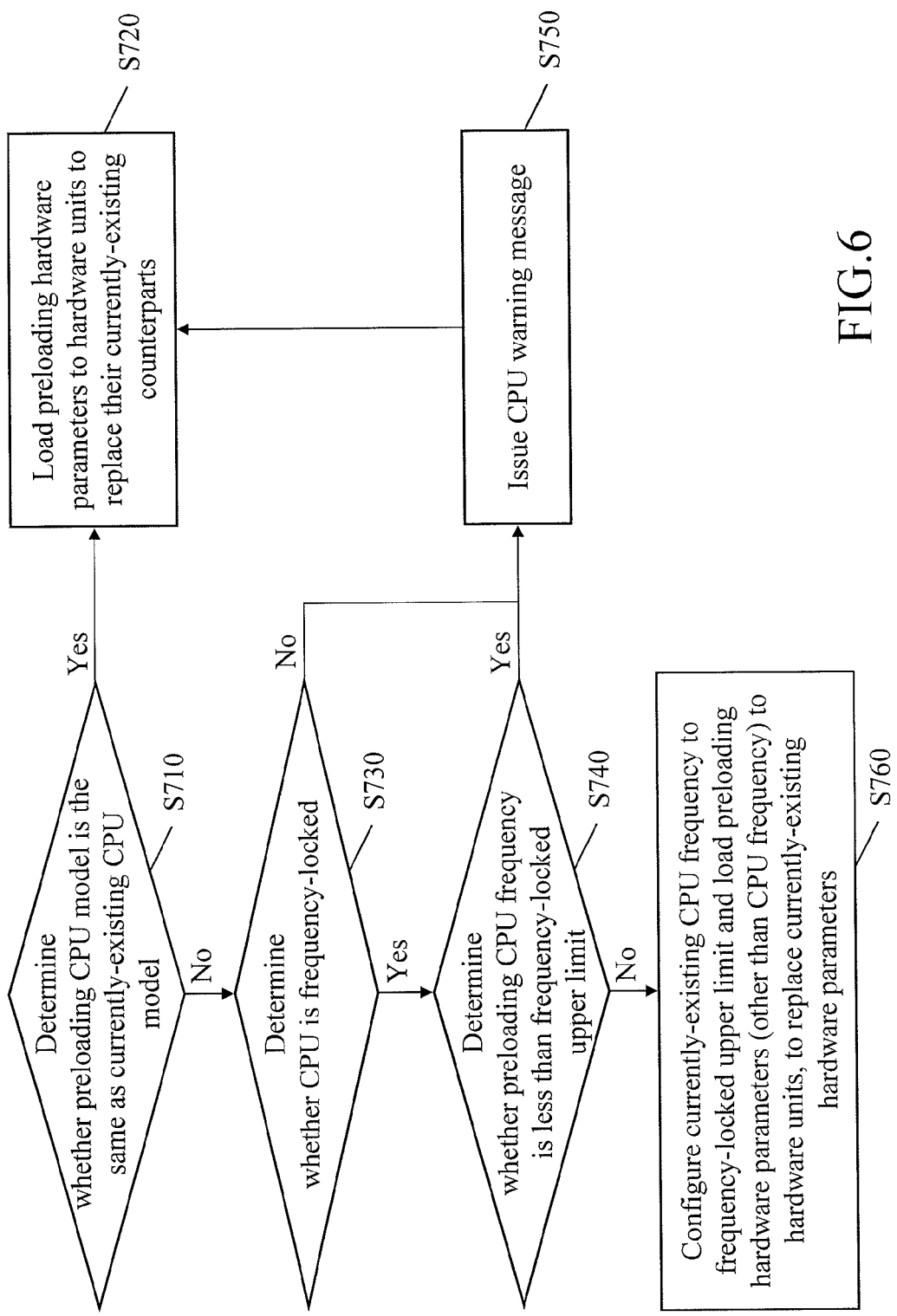
FIG. 6 is a flow chart of a mechanism minimizing damages on the computer as the result of the loading of the hardware parameters according to one embodiment of the disclosure.

Please refer to FIG. 6, which is the flowchart of such protection mechanism (step S700) according to one embodiment of the disclosure.

The CPU may firstly determine whether the preloading CPU model is the same as the currently-existing CPU model (step S710). When the preloading CPU model is the same with the currently-existing CPU model, the CPU may directly load the hardware parameters (or the hardware profile) stored in the storage device to the hardware units to replace the currently-existing ones (step S720).

Conversely, when the CPU model in the preloading hardware parameters is not the same with the currently-existing CPU model, the CPU may further determine whether the CPU is frequency-locked (step S730). When the CPU is not frequency-locked, it indicates that the CPU of the computer 20 allows the adjustments in the CPU frequency and the CPU multiplier, the selected hardware parameters associated with that CPU model may be loaded into the hardware units. However, even the CPU is not frequency-locked to operate with the hardware parameters for the different CPU model may still subject the CPU to unexpected damages, the CPU therefore may issue a CPU warning message to the computer user (step S740), before actually performing step S720 to load the preloading hardware parameters from the storage device to the hardware units. The CPU warning message indicating the inconsistency in the CPU model as one of the hardware parameters may be displayed in the warning message area 60, in the form of a warning sound or represented by lighting of light-emitting elements for informing or getting the attention of the computer user.

When the CPU is frequency-locked, the CPU is configured to determine whether the preloading CPU frequency is less than a frequency-locked upper limit of the CPU, which may be the currently-existing CPU frequency (step S750). When the preloading CPU frequency is less than the frequency-locked upper limit, the CPU may load that particular CPU frequency to the hardware unit (i.e., the CPU itself). Still, the steps S720 and S740 may be performed to issue the CPU warning message while loading of the hardware parameters from the storage device to the computer.

Otherwise, when the preloading CPU frequency is larger than the currently-existing CPU frequency, the loading of the preloading CPU frequency may damage the operating CPU. Therefore, the CPU may be limited to operate with the currently-existing CPU frequency in order to prevent the CPU from damage. Even so, the CPU may still load the preloading hardware parameters other than the CPU frequency to the hardware units to replace the corresponding currently-existing ones (step S760). Despite the CPU does not necessary load that particular CPU frequency exceeding the frequency-locked upper limit into the computer, another kind of CPU warning message may be further generated.

Figure 7:
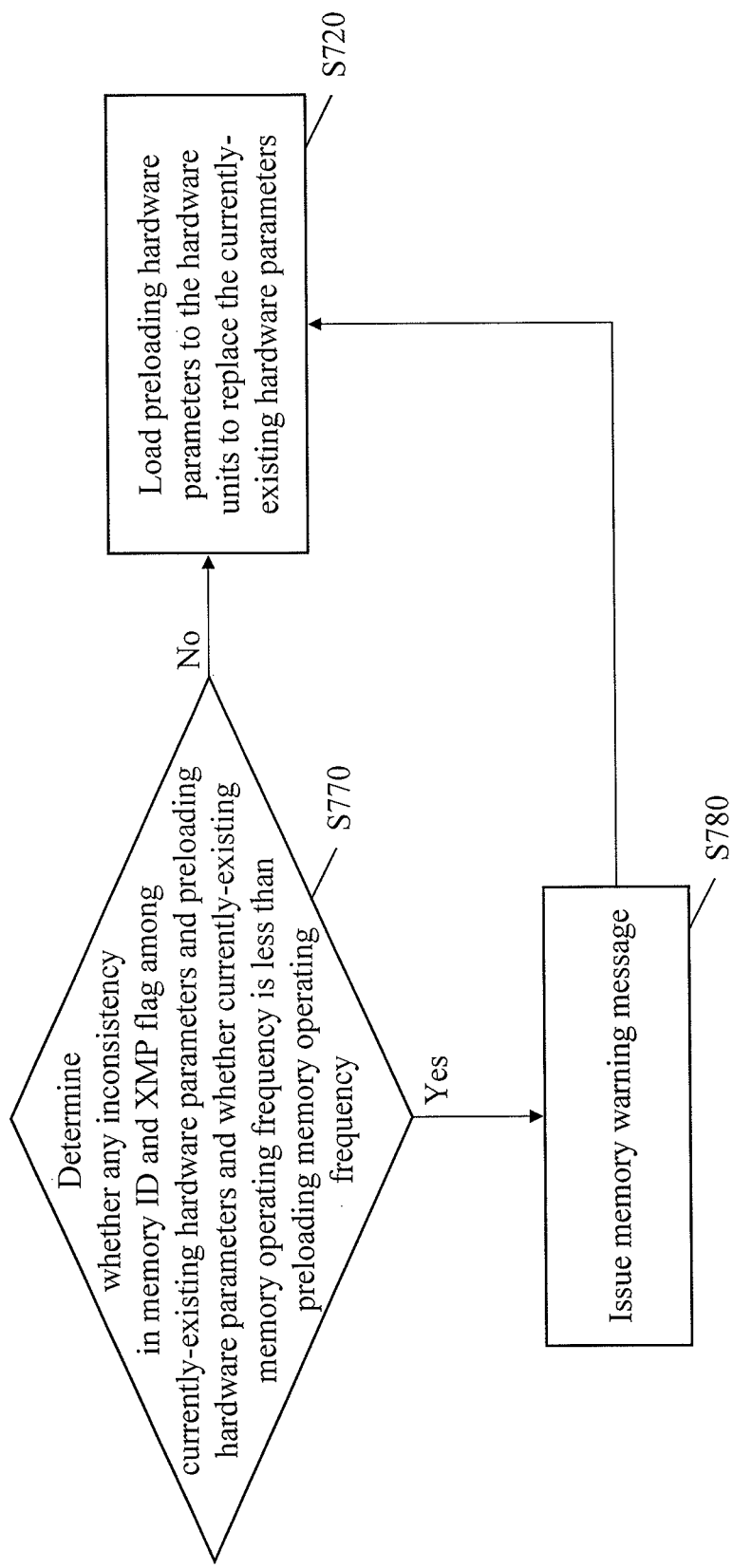
FIG. 7 is a flow chart of a protection mechanism offered to the memory according to one embodiment of the disclosure.

In addition to the operation of the CPU, the operation of the memory may be protected in the disclosure. Please refer to FIG. 7, which is a flow chart of a protection mechanism offered to the memory according to one embodiment of the disclosure.

The currently-existing hardware parameters and their corresponding preloading hardware parameters also include memory identification (ID), a memory operating frequency, and an extreme memory profile (XMP) flag. The CPU may determine whether there is any inconsistency in the memory ID and the XMP flag among the currently-existing hardware parameters and the preloading hardware parameters and whether the currently-existing memory operating frequency is less than the preloading memory operating frequency (step S770). If so, the memory-related hardware parameters may not be suitable for the current memory. Accordingly, the CPU may issue a memory warning message (step S780) to alert the computer users. The memory warning message may also be displayed on the warning message area when the memory warning message may be textual, in the form of a warning sound, or getting the attention of people by light emitting of the light-emitting elements.

On the other hand, if either the memory ID being consistent in the currently-existing hardware parameters and the preloading hardware parameters, the XMP flag being the same in both hardware parameter categories, or the preloading memory operating frequency being not greater than the currently-existing memory operating frequency, the CPU may directly access the storage device to read the preloading hardware parameters to the hardware units to replace the currently-existing ones (step S720).

Meanwhile, each of the hardware unit may be associated with its corresponding preset safety range. If the preloading hardware parameters exceed the safety range, another warning message may be issued. Such preloading warning may be clearly showed in the form of the hardware parameters in step S400.

In summary, the hardware parameter setting method according to the disclosure may evaluate whether loading another set of the hardware parameters to replace the currently-existing ones is beneficial, before actually loading the hardware parameters to the computer. Moreover, in the UEFI BIOS mode, the preloading hardware parameters from the storage device into the computer may be read from the storage device for the generation of the comparison result between the preloading hardware parameters and the currently-existing ones. The comparison result may therefore indicate whether the loading of the preloading hardware parameters benefits the computer or even suitable for the operation of the computer. The method of this disclosure may also cause the CPU to operate without going beyond the limits associated with frequency-locked CPU to avoid the CPU from suffering damages.

The disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and region of equivalency of the claims are to be embraced within their scope.

What is claimed is:

1. A hardware parameter configuring method in an Extensible Firmware Interface-based basic input/output system mode for configuring a plurality of hardware units of a computer, the hardware parameter configuring method comprising:
    reading a currently-existing hardware profile including a plurality of currently-existing hardware parameters;
    reading a preloading hardware profile, the preloading hardware profile including a plurality of preloading hardware parameters and each of the preloading hardware parameters corresponding to each of the currently-existing hardware parameters;
    comparing the currently-existing hardware parameters with their corresponding preloading hardware parameters, to generate a comparison result;
    displaying the currently-existing hardware parameters, the preloading hardware parameters and the comparison result through a graphical interface; and
    loading the preloading hardware parameters to the hardware units to replace the currently-existing hardware parameters upon a receipt of a confirmation signal;
    wherein the comparison result comprises at least one rising indicator, and the step of comparing the currently-existing hardware parameters and their corresponding preloading hardware parameters to generate the comparison result further comprises:
    comparing the currently-existing hardware parameters and their corresponding preloading hardware parameters individually;
    generating the rising indicator for each of the currently-existing hardware parameters that is greater its corresponding preloading hardware parameter when at least one of the currently-existing hardware parameters is greater than its corresponding preloading hardware parameters; and
    generating the rising indicator for each of the preloading hardware parameters that is greater than its corresponding currently-existing hardware parameter when at least one of the currently-existing parameter is less than its corresponding preloading hardware parameters.

2. The method according to claim 1 wherein both the currently-existing hardware parameters and the preloading hardware parameters comprise a central processing unit (CPU) model, a CPU frequency, a CPU multiplier, a CPU operating voltage, a memory operating frequency, a memory operating voltage, and a video card multiplier.

3. The method according to claim 2, wherein the preloading hardware parameters further comprise a motherboard brand and model, a basic input-output system version, a file storage time, a memory capacity, an ambient temperature, a CPU temperature, and a fan speed.

4. The method according to claim 1, wherein the comparison result includes at least one difference indicator, and the step of comparing the currently-existing hardware parameters with their corresponding preloading hardware parameters to generate the comparison result further comprises:
    calculating a difference between each of the currently-existing hardware parameters and its corresponding preloading hardware parameters individually; and generating the difference indicator for the difference that is not equal to zero when the difference is not equal to zero.

5. The method according to claim 1, wherein both the currently-existing hardware parameters and their corresponding preloading hardware parameters comprise a CPU model, and the step of loading the preloading hardware parameters to the hardware units to replace the currently-existing hardware parameters further comprises:
loading the preloading hardware parameters to the hardware units to replace the currently-existing hardware parameters when the CPU model in the preloading hardware parameters is the same as the CPU model in the currently-existing hardware parameters; and
performing following steps when the CPU model of the currently-existing hardware parameters is different from the CPU model of the preloading hardware parameters, wherein the steps comprise:
determining a CPU of the computer is frequency-locked according to the CPU model of the currently-existing hardware parameters; and
loading the preloading hardware parameters into the hardware units to replace the currently-existing hardware parameters, and issuing a CPU warning message to indicate that the CPU model of the preloading hardware parameters is different to the CPU model of the currently-existing hardware parameters, when the CPU of the computer is not frequency-locked.

6. The method according to claim 5, wherein the currently-existing hardware parameters and their corresponding preloading hardware parameters further comprise a CPU frequency, and the step of loading the preloading hardware parameters into the hardware units to replace the currently existing hardware parameters further comprises:
performing following steps when the CPU of the computer is frequency-locked, wherein the steps comprise:
configuring the CPU frequency to a frequency-locked upper limit, and loading the preloading hardware parameters except the CPU frequency into the hardware unit to the hardware units to replace the currently-existing hardware parameters, when the CPU frequency in the preloading hardware parameters is greater than the frequency-locked upper limit of the CPU: and
loading the preloading hardware parameters into the hardware units to replace the currently-existing hardware parameters, when the CPU frequency of the preloading hardware parameters is less than or equal to the frequency-locked upper limit.

7. The method according to claim 1, wherein both the currently-existing hardware parameters and their corresponding preloading hardware parameters to the computer comprise an identification (ID) of a memory, a memory operating frequency and an extreme memory profile (XMP) flag, and the step of loading the preloading hardware parameters to the hardware units to replace the currently-existing hardware parameters further comprises:
issuing a memory warning message when the ID of the memory in the preloading hardware parameters is different to the ID of the memory in the currently-existing hardware parameters, the memory operating frequency in the preloading hardware parameters is different to the memory operating frequency in the currently-existing hardware parameters, and the XMP flag the preloading hardware parameters is different to the XMP flag in the currently-existing hardware parameters.

8. The method according to claim 1 wherein the preloading hardware profile is stored in a computer storage device, and the step of reading the preloading hardware profile further comprises:
accessing the storage device to read the preloading hardware profile.

9. A computer having a plurality of hardware units operating with a plurality of currently-existing hardware parameters, with one of the hardware units being a central processing unit (CPU) and the CPU is configured to carry out a method:
reading a current-existing hardware profile including a plurality of hardware parameters;
reading a preloading hardware profile, the preloading hardware profile including a plurality of preloading hardware parameters, wherein each of the preloading hardware parameters corresponds to each of the currently-existing hardware parameters respectively;
comparing the currently-existing hardware parameters with their corresponding preloading hardware parameters, to generate a comparison result;
display the currently-existing hardware parameters, the preloading hardware parameters and the comparison result through a graphical interface; and
loading the preloading hardware parameters to the hardware units to replace the currently-existing hardware parameters upon a receipt of a confirmation signal;
wherein the comparison result comprises at least one rising indicator, and the step of comparing the currently-existing hardware parameters and their corresponding preloading hardware parameters to generate the comparison result further comprises:
comparing the currently-existing hardware parameters and their corresponding preloading hardware parameters individually;
generating the rising indicator for each of the currently-existing hardware parameters that is greater its corresponding preloading hardware parameter when at least one of the currently-existing hardware parameters is greater than its corresponding preloading hardware parameters; and
generating the rising indicator for each of the preloading hardware parameters that is greater than its corresponding currently-existing hardware parameter when at least one of the currently-existing parameter is less than its corresponding preloading hardware parameters.

10. The computer according to claim 9 wherein both the currently-existing hardware parameters and the preloading hardware parameters comprise a central processing unit (CPU) model, a CPU frequency, a CPU multiplier, a CPU operating voltage, a memory operating frequency, a memory operating voltage, and a video card multiplier.

11. The computer according to claim 10, wherein the preloading hardware parameters further comprise a motherboard brand and model, a basic input-output system version, a file storage time, a memory capacity, an ambient temperature, a CPU temperature, and a fan speed.

12. The computer according to claim 9, wherein the comparison result includes at least one difference indicator, and the step of comparing the currently-existing hardware parameters and their corresponding preloading hardware parameters to generate the comparison result further comprises:
calculating a difference between each of the currently-existing hardware parameters and its corresponding preloading hardware parameter individually; and
generating the difference indicator for the difference that is not equal to zero when the difference is not equal to zero.

13. The computer according to claim 9, wherein both the currently-existing hardware parameters and their corresponding preloading hardware parameters comprise a CPU model, and the step of loading the preloading hardware parameters to the hardware units to replace the currently-existing hardware parameters further comprises:

loading the preloading hardware parameters into the hardware units to replace the currently-existing hardware parameters when the CPU model of the preloading hardware parameters is the same as the CPU model of the currently-existing hardware parameters;

performing following steps when the CPU model of the currently-existing hardware parameters is different from the CPU model of the preloading hardware parameters, wherein the steps further comprise:

determining the CPU of the computer is frequency-locked according to the CPU model of the currently-existing hardware parameters; and loading the preloading hardware parameters into the hardware units to replace the currently-existing hardware parameters, and issue a CPU warning message to indicate that the CPU model of the preloading hardware parameters is different to the CPU model of the currently-existing hardware parameters, when the CPU of the computer is not frequency-locked.

14. The computer according to claim 13, wherein the currently-existing hardware parameters and their corresponding preloading hardware parameters further comprise a CPU frequency, and the step of loading the preloading hardware parameters to the hardware units to replace the currently existing hardware parameters further comprises:

when the CPU is frequency-locked, the method further comprises:

configuring the CPU frequency to a frequency-locked upper limit, and loading the preloading hardware parameters except the CPU frequency into the hardware unit to the hardware units to replace the currently-existing hardware parameters, when the CPU frequency in the preloading hardware parameters is greater than a frequency-locked upper limit of the CPU; and loading the preloading hardware parameters into the hardware units to replace the currently-existing hardware parameters when the CPU frequency of the preloading hardware parameters is less than or equal to the frequency-locked upper limit.

15. The computer according to claim 9, wherein both the currently-existing hardware parameters and their corresponding preloading hardware parameters to the computer comprise an identification (ID) of a memory, a memory operating frequency as well as an extreme memory profile (XMP) flag, and the step of loading the preloading hardware parameters to the hardware units to replace the currently-existing hardware parameters further comprises:

issuing a memory warning message when the ID of the memory in the preloading hardware parameters is different to the ID of the memory in the currently-existing hardware parameters, the memory operating frequency in the preloading hardware parameters is different to the memory operating frequency in the currently-existing hardware parameters, and the XMP flag the preloading hardware parameters is different to the XMP flag in the currently-existing hardware parameters.

16. The computer according to claim 9 further comprising a computer storage device for storing the preloading hardware profile, wherein the CPU reads the preloading hardware profile by accessing the storage device.

\* \* \* \* \*